United States Patent Office 3,829,478
Patented Aug. 13, 1974

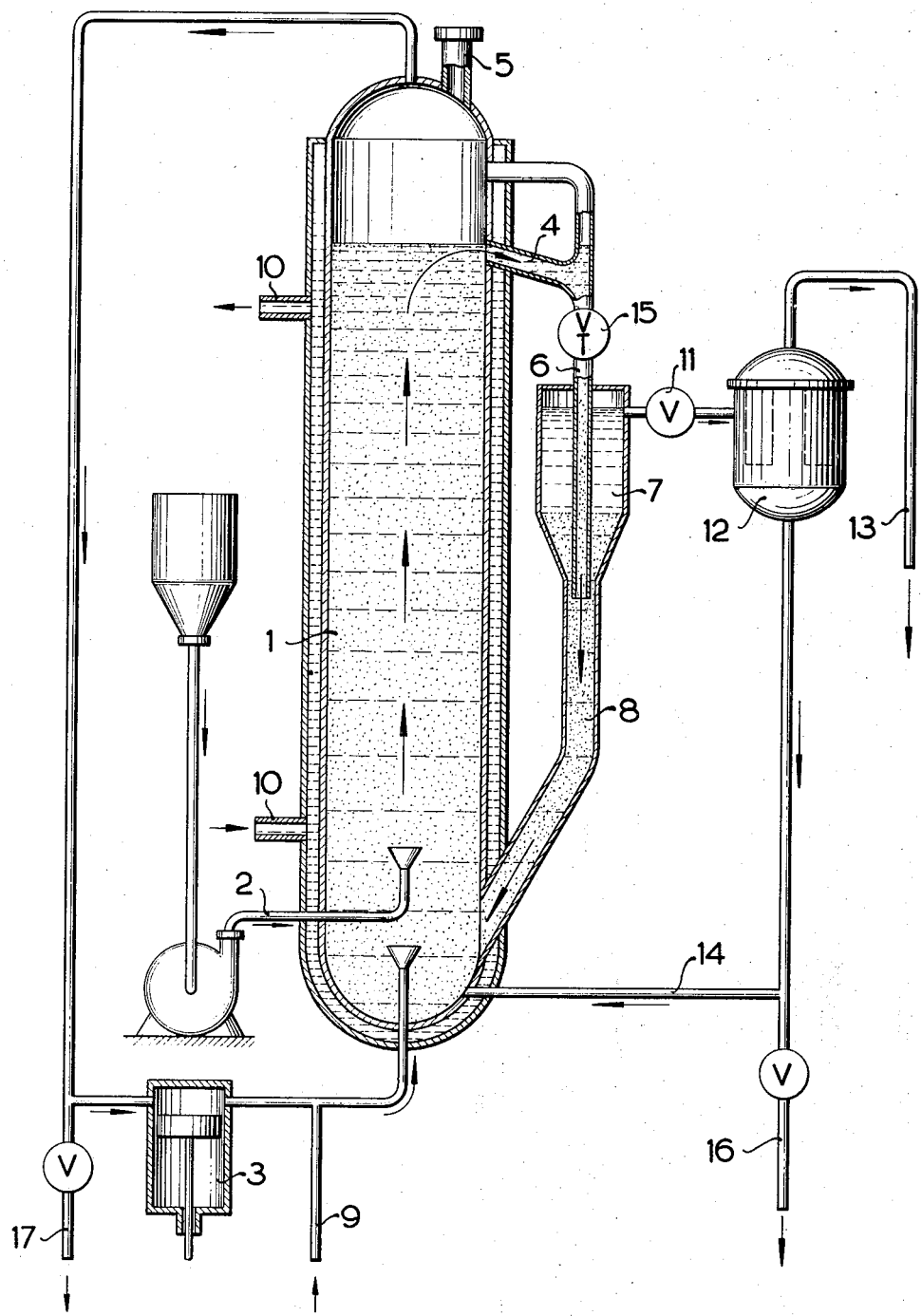

3,829,478
PROCESS FOR PREPARING MONO-
CHLORO ACETIC ACID
Alexander Ohorodnik, Liblar, Kurt Sennewald, Hurth-
Hermulheim, Joachim Hundeck, Hurth-Knapsack, and
Paul Stutzke, Walberberg, Germany, assignors to
Knapsack Aktiengesellschaft, Knapsack, near Cologne,
Germany
Filed Oct. 27, 1971, Ser. No. 192,871
Claims priority, application Germany, Oct. 29, 1970,
P 20 53 115.1
Int. Cl. C07c 53/16
U.S. Cl. 260—539 A                    3 Claims

ABSTRACT OF THE DISCLOSURE

Heterogeneous catalytic reactions are carried out continuously in liquid phase. A substantially uniform suspension of liquid starting material and fine particulate catalyst together with resulting reaction product is continuously conveyed upwardly in a reaction zone by the introduction, in accordance with the principles of an airlift pump, of a gas or vaporous material near the bottom of the reaction zone, and recycled downwardly through a reflux line to the bottom of the reaction zone. The path of liquid material through the reflux line is interrupted by an injector system situated in a closed catalyst-separating zone containing reaction product. Following establishment of the reaction equilibrium, starting material is continuously supplied near the bottom of the reaction zone and crude but catalyst-free reaction product continuously removed near the head of the catalyst-separating zone. Reaction product which is to be removed is caused to travel through the catalyst-separating zone with the injector system therein towards the reaction product outlet at a velocity smaller than the sedimentation velocity of the catalyst under the prevailing operational conditions.

---

Heterogeneous catalytic reactions involving gaseous reactants are very commonly carried out in industry in contact with a solid catalyst disposed in either a static bed or a fluidized bed. Numerous technologically beneficial effects are obtained if use is made of a fluidized bed (for example high coefficients of heat transmission, i.e. easy supply and abstraction of heat; uniform temperature distribution in the reaction zone; and easy addition or removal of catalyst); while the most important beneficial effect obtained if use is made of a static bed is seen to reside in the omission of catalyst separators, which are unnecessary therein. In the fluidized bed process, the catalyst is separated from gaseous reaction products mainly with the use of various cyclone systems and gas filters. The utilization of the difference in density between catalyst (solid material) and reaction medium (gas phase) is the principle underlying catalyst separation. Needless to say, catalyst separation is rendered more difficult the smaller the difference in density between catalyst and reaction medium. Basically different conditions prevail, however, if the gaseous reaction medium is replaced by a liquid phase medium. From such a medium the catalyst is no longer easy to remove, for example by means of a cyclone. Under commercial conditions, such reactions are most commonly carried out by allowing the mixture, which has a certain quantity of catalyst therein, to undergo complete reaction therewith, subsequently separating the two phases from one another in a filtering apparatus outside the reactor, and re-using the catalyst so isolated together with fresh starting mixture in the reactor. In other words, the process is carried out batchwise.

This, however, is an expensive procedure which entails considerable difficulties under commercial conditions.

The present invention provides an apparatus, described below with reference to a preferred embodiment, for carrying out heterogeneous catalytic reactions in a fluidized bed in liquid phase, which avoids difficult batchwise operation and also provides substantial beneficial effects normally associated with reactions involving a fluidized bed and a gas phase. The process of the present invention is particularly useful in carrying out reactions using solid phase material (catalyst) in combination with gaseous and liquid phase materials (starting material).

The process of the present invention may be carried out with the use of the preferred form of apparatus shown diagrammatically in the single Figure of the accompanying drawing, which enables both exothermic and endothermic reactions to be effected therein.

As can be seen from the Figure, a jacketed reactor 1 is filled with liquid starting material travelling through a conduit 2, and a gas is then forced through the liquid phase, by means of a circulating pump 3. As soon as the liquid is at the level of an overflow 4, catalyst is added through an inlet 5. The gas forced through the liquid phase effects circulation of the suspension (this takes place in accordance with the principle of an air lift pump) through a conduit 6, a separator 7, a conduit 8 and the reactor 1. Connections 10 are provided to permit the circulation of a heating liquid and thereby supply the jacket and hence the whole reactor system with whatever thermal energy may be necessary to carry out the reaction. Naturally, connections 10 may also be used for supplying a cooling liquid to the jacket and for dissipating heat evolved during the reaction. In most cases, a recycle gas is employed in the reaction (e.g. hydrogenation), although there is still a need continuously to replace the gas consumed, through a conduit 9.

Following complete reaction of the reaction mixture which is circulated, fresh starting material is introduced into the reactor, through conduit 2, at a rate consistent with the reaction velocity in the system. At the same time, a valve 11 provided on the separator 7 is opened and completely reacted product is taken out from the separator 7 through filtering means 12 (e.g. candle filters) and a discharge line 13.

The arrangement described above has unexpectedly been found to avoid the discharge of catalyst. Traces of catalyst (less than 1% per day) which leave the separator 7 are retained in the filtering means 12 and returned from time to time to the reactor 1 through a conduit 14, or discharged through a conduit 16. The process of the present invention, wherein a reaction in a fluidized bed in liquid phase is as easy to carry out as in gas phase, provides a simple and reliable solution to the problem of catalyst separation.

In the manner described hereinabove, it is possible continuously to supply a reaction system with starting material and continuously to discharge reaction product therefrom without the need to interrupt operation. There are two conditions which critically affect catalyst separation:

(a) As shown in the accompanying drawing, conduit 6 should open into conduit 8 so as to form an injector system and provide for a suction intake into conduit 8, at the level of the lower tapered end of separator 7.

(b) Material which is to be removed from separator 7 in an upward direction via valve 11 and filtering means 12 should travel upwardly in separator 7 at a velocity smaller than the sedimentation velocity of the catalyst in the liquid phase.

Requirement "(a)" above is very easy to meet by the provision of appropriate structural features, and more particularly by arranging conduit 6 so as to open concentrically into conduit 8. If the velocity of flow in conduit 6 becomes excessively high and disturbances are likely to occur, a throttling member 15 (which may be a slide, for example) may be actuated and the velocity of flow can thus be reduced according to requirements.

Structural means can also be used to meet requirement "(b)" above. To this end, separator 7 can be given a diameter which avoids removal of catalyst of given particle size and density through valve 11. The sedimentation velocity prevailing in a separator 7 with a given diameter can be varied by varying the particle size of the catalyst. The preparation of catalysts with a particle size suitable for use in a fluidized bed in liquid phase by spray-drying is an easy procedure and raises no problems.

The present invention thus provides a process for carrying out heterogeneous catalytic reactions continuously in liquid phase, wherein a substantially uniform suspension of liquid starting material and fine particulate catalyst together with resulting reaction product is continuously conveyed upwardly in a reaction zone by the introduction, in accordance with the principle of an air-lift pump, of a gas or vaporous material near the bottom of the reaction zone, and recycled downwardly through a reflux line to the bottom of the reaction zone, the path of liquid material through the reflux line being interrupted by an injector system situated in a closed catalyst-separating zone containing reaction product; and wherein, following establishment of the reaction equilibrium, starting material is continuously supplied near the bottom of the reaction zone and crude but catalyst-free reaction product continuously removed near the head of the catalyst-separating zone, and reaction product which is to be removed is caused to travel through the catalyst-separating zone with the injector system therein towards the reaction product outlet at a velocity smaller than the sedimentation velocity of the catalyst under the prevailing operational conditions.

Further preferred features of the present invention provide (a) for the crude product which is removed near the head of the catalyst-separating zone to be freed from any catalyst particles carried along therewith, and for the catalyst filtered off therefrom to be recycled to the bottom portion of the reaction zone;

(b) for the gas or vaporous material introduced near the bottom of the reaction zone to be used as a reactant;

(c) for unreacted gas or vaporous material to be withdrawn near the head of the reaction zone and to be recycled by means of a pump to the bottom portion of the reaction zone, together with fresh gas or vaporous material to replace the quantity consumed; and (d) for the gas or vaporous material to comprise hydrogen, nitrogen, carbon monoxide or dioxide, oxygen or steam.

The experiment hereinafter set forth, and the working Example which follows it, describe typical heterogeneous catalytic reactions in a fluidized bed in liquid phase, and they are more particularly intended further to illustrate the process of the present invention. The reaction described herein for the purpose of illustration is the hydrogenative dehalogenation of dichloroacetic acid to produce monochloroacetic acid in contact with a Pd-containing catalyst in commercial monochloroacetic acid, which is carried out in accordance with the following equation:

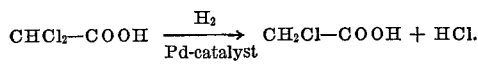

$$CHCl_2-COOH \xrightarrow[\text{Pd-catalyst}]{H_2} CH_2Cl-COOH + HCl.$$

The reaction is carried out at temperatures between 125 and 155° C.

EXPERIMENT (This experiment is not an Example of a process which is actually in accordance with the present invention, nor is use made therein of a circulation system such as that shown in the accompanying drawing; despite this, it clearly shows the beneficial effects which are obtained if use is made of a fluidized bed in liquid phase).

Three heatable reactors (of which each had a diameter of 5 centimeters and a height of 50 centimeters) were used, and 400 grams (about 300 milliliters) of commercial monochoroacetic acid containing 6 weight percent of dichloroacetic acid were supplied to each of the reactors; a constant temperature of 140° C. was maintained therein by circulation of a heating liquid. 50 liters/hr. of hydrogen per reactor were passed in the form of small bubbles (issuing from frits) through the hot starting mixture. Monochloroacetic acid, which passed out of the reactors together with the gas stream, was condensed in a cooler disposed at the respective reactor outlet, and the resulting condensate was recycled to the reaction zone. Each of the three reactors having the same starting mixture therein was supplied, under absolutely comparable reaction conditions, with 100 grams of catalyst; three different catalysts were used, consisting of 0.5 weight percent of Pd deposited on $SiO_2$, which merely differed from each other in particle size. The following reaction times were needed to achieve a 90% conversion of dichloroacetic acid to monochloroacetic acid, this reaction time being dependent upon the particle size of the catalyst.

| Particle size, mm. | Reaction time, hours |
| --- | --- |
| 0.1 | 1.5 |
| 3 | 7 |
| 8 | 11.5 |

The test result shows clearly that, for the use of identical amounts of Pd (0.5 gram) and carrier (99.5 grams), the Pd-catalyst deposited on the carrier with a particle size of 0.1 mm. was approximately five times as active as the Pd-catalyst deposited on the carrier with a particle size of 3 mm. In other words, for the same amount of Pd, the fine catalyst (0.1 mm.) gave an almost 500 percent higher space/time yield; or almost 500 percent more of the coarse catalyst (3 mm.) was required to attain the same space/time-yield. The three catalysts tested were found to behave basically differently during the reaction, upon the passage of hydrogen therethrough. A substantially uniform suspension, comprising a fluidized bed in liquid phase, was obtained in the case of the fine catalyst (0.1 mm.), but an essentially static bed, merely tending towards a fluidized bed, was produced in the two reactors supplied with the coarse catalysts (3 mm. and 8 mm.).

EXAMPLE

The Example was run in a pilot plant arranged as shown in the accompanying drawing. Reactor 1 with a capacity of 40 liters (height=8 meters) was charged with crude monochloracetic acid containing 6 weight percent of dichloracetic acid. By the introduction of nitrogen the starting mixture was circulated until 2 kg. of catalyst had been added, through a valved inlet. The catalyst comprised 0.5 weight percent of metallic palladium deposited on 99.5 weight percent of a $SiO_2$-carrier and consisted of particles with a size of between 60 and 150 microns. Following this, hydrogen was introduced through line 9 into the circulating gas and gas mixture was withdrawn through line 17 until all the nitrogen was replaced by hydrogen. At the same time, the reactor was heated to 140° C. by circulating a hot fluid through the reactor jacket, by way of connections 10. The hydrogenating dehalogenation of dichloroacetic acid to monochloroacetic acid and hydrogen chloride was found to start at a temperature as low as 110–120° C. The circulating gas was maintained under constant pressure by the supply of hydrogen through line 9, whcih replaced the hydrogen consumed during the reaction. The hydrogen chloride evolved was water-scrubbed and discharged. The water scrubbing stage and two gas coolers were disposed near the reactor outlet. These assemblies or units did not influence the functioning of the fluidized bed reactor, and therefore are not shown in the drawing. Once the dichloroacetic acid concentration in the reaction mixture had dropped down to a desirable value (less than 0.5 weight percent), there were added 8 kg. of fresh starting material through line 2, and a corresponding quantity of pure product was taken out, through line 13. In the apparatus described, it was possible to purify monochloroacetic acid over a period of several months with no interruptions or other disturbances. The catalyst separation system worked so reliably that no more than 10 to 20 grams of catalyst (average quantity) per day passed out from the catalyst separator 7 to filtering device 12, for a material throughput of 200 kg./day. Catalyst passing out from the catalyst separator accumulated at the bottom of device 12 and was recycled (e.g. by injection), at 8 to 10 day intervals, to the reactor, through line 14. The apparatus was found practically to avoid loss of catalyst, over an operation period of 6 months.

The catalyst productivity was between 50 and 55 grams of hydrogenated dichloroacetic acid, per gram of Pd. So high a catalyst productivity per gram of Pd was unobtainable heretofore, regardless of the catalyst used, in the dehalogenation of dichloroacetic acid to produce monochloroacetic acid. The unexpectedly good results obtained in the pilot plant described hereinabove, for example in the dehalogenation of dichloroacetic acid to produce monochloroacetic acid, are certainly due to the adoption of the process of the present invention, which ensures an optimum interchange of material in heterogeneous catalysis in liquid phase. The process of the present invention therefore is highly suitable for use in effecting the most various heterogeneous catalytic reactions in liquid phase, for example oxidation or hydrogenating reactions. The pilot plant described above can be used for effecting reactions therein at atmospheric pressure or elevated pressure. A reaction pressure of 3 atmospheres gauge should most conveniently be used for the dehalogenation of dichloroacetic acid described by way of example herein. Higher pressures could not be found to produce better results.

The claims:

1. A process for the production of monochloroacetic acid being substantially free from dichloroacetic acid by dechlorinating dichloracetic acid contained in crude monochloracetic acid to monochloracetic acid with hydrogen gas in contact with a catalyst consisting essentially of palladium deposited on a carrier material in a fluidized bed in liquid phase at temperatures between 110 and 155° C. in a reaction zone comprising a jacketed reactor provided at its lower part with a liquid matter inlet projecting thereinto and supplying the reactor with liquid starting material; a supply tube disposed at the head of the reactor feeding fine particulate catalyst thereinto for suspending it in the said liquid material; an overflow comprising an upper portion and a lower portion disposed at the upper part of the reactor; a reflux conduit opening into the lower part of the reactor and having a catalyst separator mounted thereon, the separator having a lower tapered end; the said overflow projecting outwardly from the reactor, projecting into the said separator from above and extending downwardly at least to the lower tapered end thereof so as to form an injector providing for a suction intake into the reflux conduit; a gas inlet disposed at the lower end of the said reactor projecting and delivering gaseous matter thereinto so as to cause air lift pump circulation of the suspension of fine particulate catalyst, liquid starting material and resulting liquid reaction product upwardly through the said reactor to and through overflow and down through the reflux conduit back into the reactor; an outlet disposed at the head of the reactor removing gaseous matter therefrom; and a valved conduit projecting outwardly from the upper part of the catalyst separator and opening into a filtering means retaining traces of catalyst coming from the catalyst separator and travelling through said conduit; the said filtering means being fitted with an upper reaction product outlet and a lower catalyst discharge or reflux line, which process comprises continuously conveying upwardly in the said reactor a substantially uniform suspension of liquid crude monochloroacetic acid containing dichloroacetic acid and fine particulate catalyst together with resulting reaction product, the upward flow being effected by the introduction, in accordance with the principle of an air-lift pump, of hydrogen gas into, near the bottom of, the reactor, recycling downwardly the said suspension through the reflux conduit to the bottom of the reactor; the recycled suspension passing through the injector system situated in the reflux conduit in the closed catalyst-separator containing reaction product consisting of monochloroacetic acid being substantially free from dichloracetic acid; following establishment of the reaction equilibrium, continuously supplying starting material near the bottom of the reactor and continuously removing catalyst-free reaction product near the head of the catalyst-separator; flowing reaction product, which is to be removed from thte catalyst-separator, upwardly through the catalyst-separator with the injector system therein towards the reaction product outlet at a velocity smaller than the sedimentatation velocity of the catalyst in the catalyst-separator under the operational conditions prevailing whereby the amount of catalyst removed with the reaction product is minimized.

2. The process as claimed in claim 1, comprising removing unreacted hydrogen gas and resulting hydrogen chloride gas near the head of the reactor, water-scrubbing the material removed and recycling, by means of a pump, remaining hydrogen gas to the bottom portion of the reactor, together with fresh hydrogen gas replacing the quantity consumed.

3. The process as claimed in claim 1, comprising freeing reaction product, which is removed near the head of the catalyst separator, from any catalyst particles carried along therewith and recycling the catalyst particles filtered off therefrom to the bottom of the reactor.

References Cited

UNITED STATES PATENTS

| 2,863,917 | 12/1958 | Rucker et al. | 260—539 A |
| 2,450,753 | 10/1948 | Guyer | 260—288 E |
| 2,599,466 | 6/1952 | Lienhart | 23—288 E |
| 3,759,669 | 9/1973 | Aaron et al. | 23—288 E |
| 3,418,391 | 12/1968 | Cabbage | 260—288 E |
| 3,456,033 | 7/1969 | Borst | 260—288 E |
| 3,472,630 | 10/1969 | Baldwin et al. | 260—288 E |

FOREIGN PATENTS

| 1,152,766 | 5/1969 | England. |
| 33,438 | 1964 | Germany. |

OTHER REFERENCES

Perry et al.: "Chemical Engineering Handbook," McGraw-Hill (1963), pp. (20–42)–(20–52).

LORRAINE A. WEINBERGER, Primary Examiner

J. F. TERAPANE, Assistant Examiner

U.S. Cl. X.R.

23—288 E